(12) United States Patent
Devillier et al.

(10) Patent No.: US 6,366,661 B1
(45) Date of Patent: Apr. 2, 2002

(54) ONLINE CALL ROUTING APPARATUS AND METHOD

(75) Inventors: Douglas André Devillier, Plano, TX (US); Okechukwu U. Ikeako, Boulder, CO (US)

(73) Assignee: Quest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/427,376

(22) Filed: Oct. 25, 1999

(51) Int. Cl.[7] .......................... H04M 3/54; H04M 1/57; H04M 3/58; H04M 7/00; H04L 12/66
(52) U.S. Cl. ............... 379/211.01; 370/352; 370/401; 379/142.08; 379/215.01; 379/221.09; 379/900
(58) Field of Search ................................ 370/352, 353, 370/354, 355, 356, 401; 379/127, 142, 196, 197, 201, 207, 215, 127.01, 142.01, 142.08, 142.17, 201.01, 211.01, 211.02, 212.01, 214.01, 215.01, 219, 220.01, 221.08, 221.09, 900

(56) References Cited

U.S. PATENT DOCUMENTS

| | | | | |
|---|---|---|---|---|
| 5,511,111 A | * | 4/1996 | Serbetcioglu et al. ... | 379/207 X |
| 5,809,128 A | * | 9/1998 | McMullin ................... | 379/215 |
| 5,946,381 A | * | 8/1999 | Danne et al. ........... | 379/215 X |
| 5,982,774 A | * | 11/1999 | Foladare et al. ........ | 379/215 X |
| 5,999,613 A | * | 12/1999 | Nabkel et al. .......... | 379/142 X |
| 6,097,795 A | * | 8/2000 | Ungruh et al. .......... | 379/215 X |
| 6,104,800 A | * | 8/2000 | Benson ....................... | 379/215 |

* cited by examiner

Primary Examiner—Harry S. Hong
(74) Attorney, Agent, or Firm—Marsh, Fischmann & Breyfogle, LLP (57) ABSTRACT

A telephone routing system which provides notification to subscribers that an incoming telephone call has been received. In particular, the system is directed toward subscribers who employ their telephone line in order to establish a connection over the Internet. In the situation where an incoming call is received during an Internet session, the routing system provides notification to the subscriber that the call has been received. In particular, when the incoming call is received, an interactive screen display may appear on the subscriber's computer through use of the subscriber's PC software. The subscriber may be provided a selection of options on how the call should be routed. Once the instructions are received from the subscriber, the system routes the call accordingly.

14 Claims, 10 Drawing Sheets

ONLINE CALL ROUTING APPARATUS AND METHOD

FIELD OF THE INVENTION

The invention described herein relates to a system for routing telephone calls and more particularly to an advanced intelligent network system which provides for routing of telephone calls to a particular line when that line is otherwise occupied.

BACKGROUND OF THE INVENTION

With the popularity of the Internet, more and more people are establishing connections from their personal computers to the Internet using an Internet Service Provider (ISP). Using a modem in the personal computer, a system user may dial up the ISP and establish a data connection over the public switched telephone network (PSTN). At this point the ISP may further connect the system user to the Internet. The system user may then browse the Internet using web browsers installed in the personal computer.

Many Internet users commonly establish a connection from the personal computer that is located in their homes. The household telephone line is used to establish a connection to the ISP. One drawback of this type of connection is that the telephone line is occupied such that incoming calls to the household may not be answered or otherwise detected. The calling parties to the occupied line may be presented with a busy signal or consecutive rings without an answer. The caller may further be directed to a voicemail account without providing any notification to the party being called.

SUMMARY OF THE INVENTION

It has been recognized that a system may be developed which provides notification of incoming calls to a subscriber of a service while the subscriber is online. It has been further recognized that messages notifying a subscriber of services of the incoming call may be transmitted from a location on the Internet to the subscriber's computer, and through use of a display graphic, the subscriber may be provided with a choice of routing methods.

Described herein is a method and system for routing telephone calls through use of an advanced intelligent network (AIN) telephone system. Included in the system is a local switching point, which is part of the AIN telephone system, through which calls for a subscriber are received and then routed to identified destinations.

Also included in the AIN telephone system is a service control point (SCP) through which a connection may be established over the Internet in order to access various servers. A connection may also be established between the SCP and the line identification database (LIDB) which includes calling name information for the parties placing incoming calls to the subscriber.

The SCP may be adapted to establish a connection with a designated server on the Internet. The designated server may be configured to provide the SCP with subscriber status with regards to connections established to the Internet. In order to provide this status information, the subscriber may notify the server when a connection is first established over the Internet. This server may further include functionality for providing interactive display graphics to the subscriber's computer through which a subscriber may then provide information as to the routing of detected incoming calls.

With regards to the routing of calls, a number of destinations may be provided. Destinations may include a voice messaging or a forwarded number. In one instance the AIN network may include an intelligent peripheral device through which an incoming call may be temporarily routed in order to have audio messages played. Further, connected to the local switching point in the AIN may be a network interface device which provides for the establishments of lines of communication over the Internet using Internet protocol(IP) telephony methods.

In operation, when a subscriber uses the home telephone line to log onto the Internet, a procedure may take place where the designated server is contacted and status information for the subscriber is updated. In the situations where a logon is occurring, the server receives information that the subscriber is currently online. When a particular session ends, notification may again be sent to the server providing an indication that the subscriber has terminated its Internet connection.

Once the subscriber is online, an incoming call for the subscriber may be detected at the switching point associated with the subscriber. Once the call is received, the switching point may send notification to the SCP. In response the SCP may then establish a connection over the Internet to the designated server to make an inquiry as to the current status of the subscriber. This status information is transmitted back to the SCP and analysis is performed to determine the next step.

If it is determined that the subscriber is not currently logged onto the Internet, the SCP may instruct the local switching point to route the call to the subscriber's line as normal. This may include directing the call to the subscriber's home phone. If the server returns a message indicating that the subscriber is currently online, the SCP may then perform a search of the LIDB to locate identification information for the incoming caller. This identification information is then transmitted over the Internet to the server. The server may then perform the necessary steps to notify the subscriber that an incoming call is waiting.

Once the notification is received of an incoming call, the server may generate notification information which may be used to populate a display to appear on the subscriber's home computer. This display may be viewable using the web browsing software currently employed by the computer. Through the interactive graphical display, the subscriber may be provided certain options as to the disposition of the incoming call, which may included answering the call, directing the incoming call to voicemail, forwarding the call to another telephone number, or ignoring the call altogether.

In the situation where the subscriber wishes to answer the call, this selection is made through the interactive display graphic and notification of this selection is provided from the server to the SCP. This instruction may be further provided to the switch which then routes the incoming telephone call accordingly.

With regards to routing the incoming call to the subscriber, at least two options may be available. As a first option, the subscriber may choose to receive the incoming call at the local telephone. In this situation, the subscriber's connection to the data network will be terminated and the call then routed to the home telephone. Alternatively, the subscriber may choose to receive the incoming telephone call at the subscriber's computer through use of IP telephony software and hardware. In this situation, the switching point will route the call to the network interface which will then transmit the signal back to the subscriber's home through the ISP. An audio conversation may then be carried on over the Internet.

If the subscriber selects to route the incoming call to voicemail, this selection may then be provided from the server to the SCP, which in turn provides these instructions to the switching point. At this point, the call is directed through the switching point to voicemail.

If the subscriber wishes to forward the incoming call to a particular number, this selection is made and the instructions may then be provided from the server to the SCP. In one aspect of the invention, the subscriber may enter through the screen display a forwarding number to which the call will be routed. Also, the forwarding number may be pre-programed in the system. Once the forwarding instructions are received, the SCP will provide the forwarding number to the switch and the incoming call will be routed to that location.

If the subscriber chooses the ignore function, the incoming call may then be routed to a destination such as the AIN IP in which an audio message will he played which may include the continuous ringing of a telephone or such messages as "The party you are calling is not taking calls at this time" or In another aspect of the invention, while the display graphic is being transmitted to the subscriber, the incoming call may be routed to a temporary location in which an audio message is played for the incoming caller. This audio message may be the continuous ringing of a telephone or a message informing the incoming caller that the subscriber is currently online and that notification is being provided to that party.

DETAILED DESCRIPTION

Figure 1:
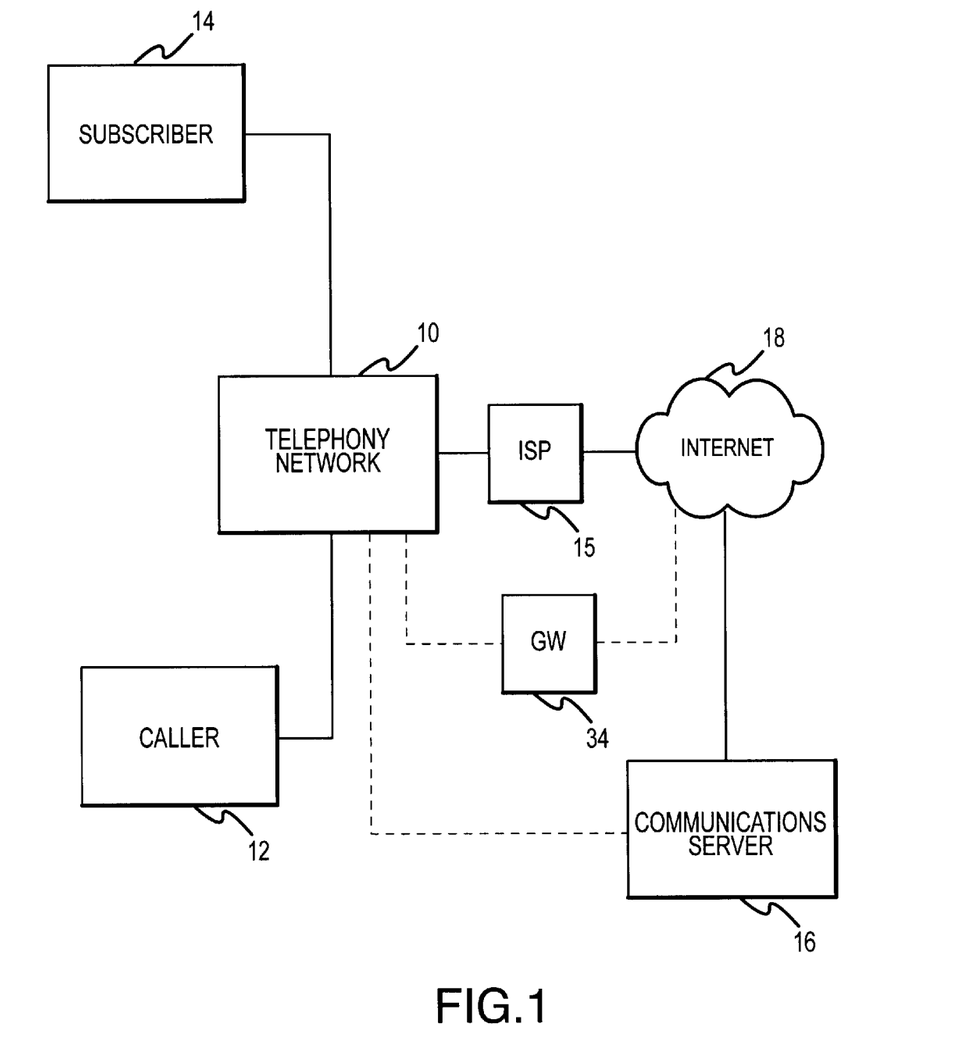
FIG. 1 discloses an overall system diagram for the present invention.

Disclosed in FIG. 1 is a general system diagram which includes a number of the elements employed in the system described herein. Lines of communications for employing the system are included in telephony network 10. In the preferred embodiment, the telephony network 10 is an advanced intelligent network (AIN) which provides a number of advanced functions for routing calls. A subscriber 14 who employs the routing system described herein, establishes a connection with the telephony network through use of a telephone or a computer with a modem connection. The subscriber may establish a connection to a data network, such as the Internet 18, over the telephony network 10. This connection may be provided through an Internet Service Provider (ISP) 15 which has a connection to the telephony network and the Internet.

A caller 12 who wishes to establish a line of communication with the subscriber 14 does this through the telephony network 10. The telephone connection to the subscriber may either be made entirely through the telephony network, or the connection may be made through the use of IP telephony through a gateway 34 connected between the telephony network and the Internet 18.

One node on the Internet is the communications server 16. Through the server, the status of the subscriber's line may be updated, and this information may be accessed by the telephone network. Further, this server may also be employed to transmit information which may populate an interactive display graphic viewable by the subscriber. This display graphic may be employed to provide and receive information with regards to the routing of incoming telephone calls.

Figure 2:
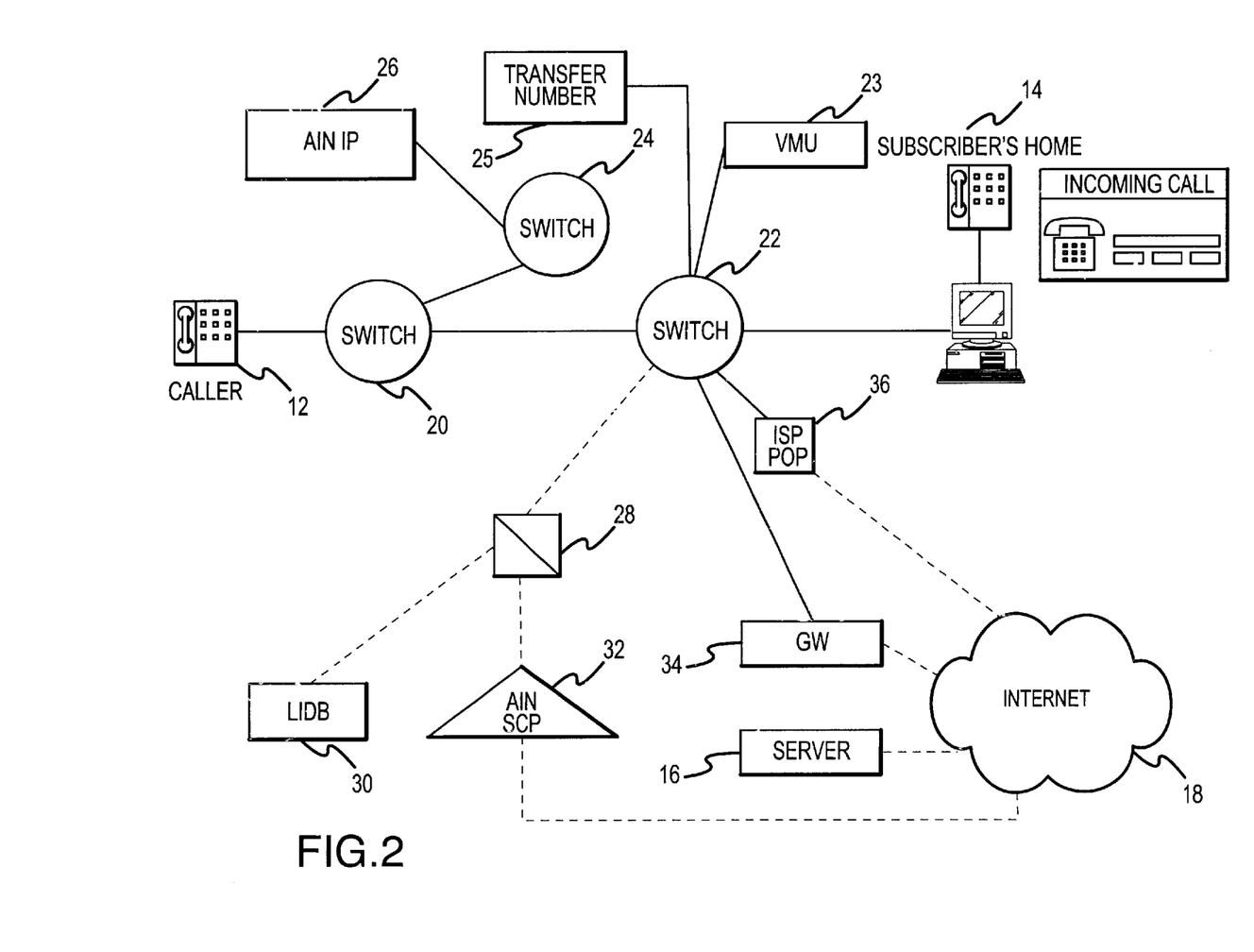
FIG. 2 discloses a system diagram for the advanced intelligent network AIN.

Disclosed in FIG. 2 is a detailed system diagram of the telephony network 10. Calls received and transmitted through the telephony network are initially processed at various service switching points (SSP's). Disclosed in the network shown in FIG. 2, are a minimal number of SSP's which are presented to provide an example of the operation of the system. One skilled in the art would realize that in an entire telephony network, there are a great number of switching points.

Incoming calls from caller 12 are initially received at SSP 20. At SSP 20, identifying information extracted from the incoming call provides for the routing of same call to SSP 22. SSP 22 is the local switching point for the subscriber through which all incoming calls (except those received via IP telephony) are routed. SSP 24 provides for the routing incoming calls to AIN IP 26 where pre-recorded audio messages may be played to the caller.

Upon the ultimate disposition of the call, the incoming call may be routed to a number of destinations. One destination includes the subscriber's home phone. Another destination may be the subscriber's computer which is equipped to handle IP telephony. The SSP 22 will route the telephone call to router 34.

Other routing options include voicemail 23 which provides for the playing of a message or greeting and the recording of any messages a caller wishes to leave. The call may be further routed to a transfer number 25 which has been programmed into the subscriber's PC. One final option is the AIN IP 26 which, as described above, provides for the playing of pre-recorded messages.

Also included as part of the telephony network is the STP 28 which provides for routing of signals to the remotely located line identification database (LIDB) 30. Also connected to the STP is the service control point (SCP) 32. The SCP 32 includes the programming information for routing telephone calls as well as a connection to the Internet 18.

Also in connection with the SSP 22 is the router gateway 34 through which IP telephony signals may be routed to and from the Internet 18. As described above, the communications server 16 is in connection with the Internet 18.

Figure 3:
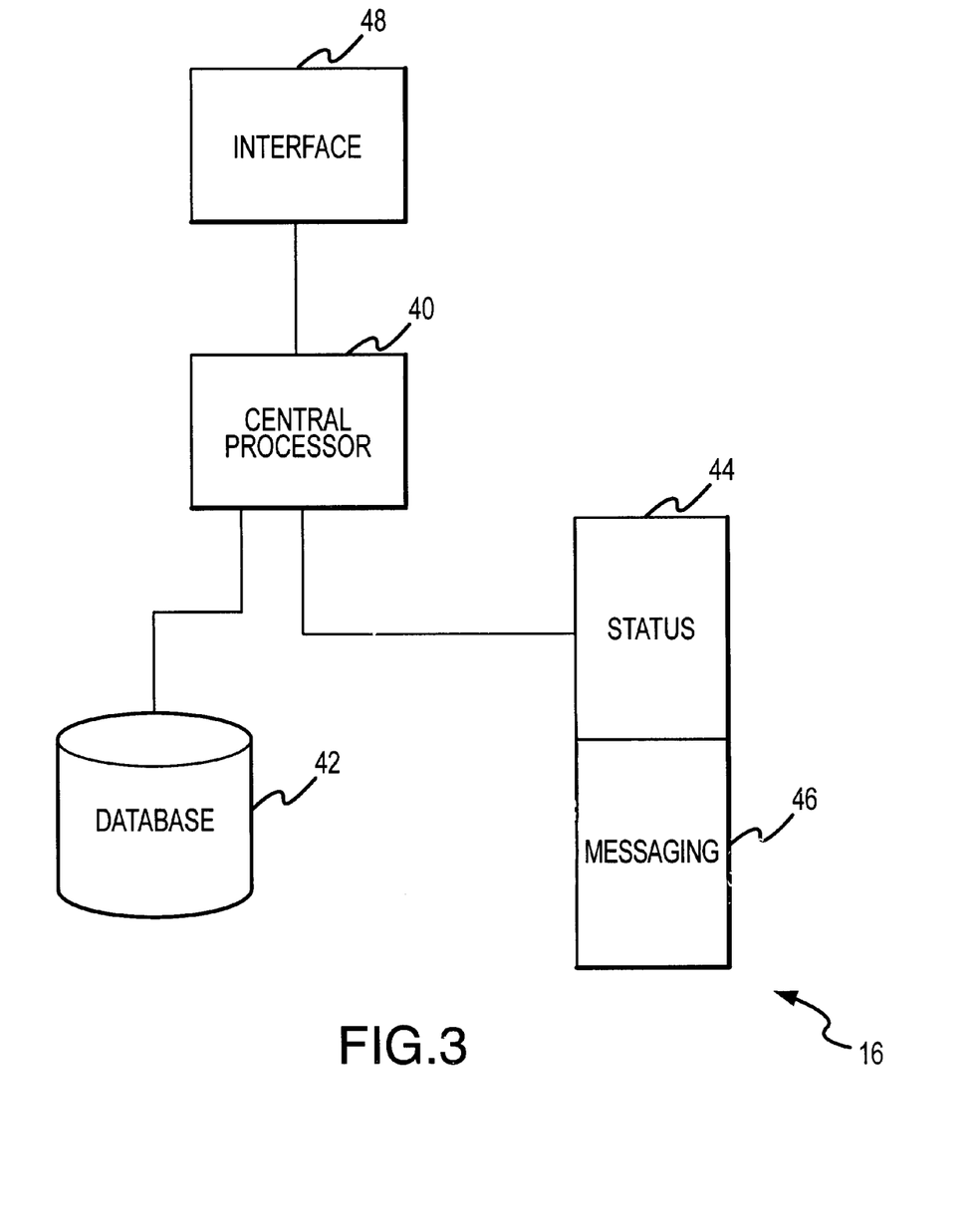
FIG. 3 discloses a system diagram for the communications server.

Disclosed in FIG. 3 is a system diagram for the communications server 16 which has been configured such that it may perform various functions for routing calls in conjunction with the system described herein. Included in the communications server is an interface 48 through which a connection to the data network may be established. Through this interface 48, communications signals from the SCP 32 may be received. Further, the interface also provides for connections established from the subscriber's PC to the communications server.

In connections with the interface 48 is central processor 40 which controls operations of the various components within the server. The central processor 40 is in connection with database 42 which in employed to store various information as to the subscribers. Also in connection with the central processor 40 are various processing modules stored in the random access memory (RAM) which perform various functions with regards to the operations of the routing system.

The status module 44 is employed to provide information as to the online status of a subscriber. When a subscriber establishes a connection with the Internet, a connection may be established with the server and through the status processing module 44 the status may be updated. When the system user logs off the data network the status also may be updated to reflect this change. An additional function performed by this module is the periodic querying of the subscriber's PC during online sessions to determine whether the Internet connection is still current.

The other processing module included in the communications server is messaging 46. This messaging module provides for the interactive communications between the communications server and the subscriber. In particular, this module provides the data which is transmitted over the Internet to subscriber which is used to populate the interactive displays which are presented on the subscriber's user interface. Once the subscriber has made a selection, through the messaging module, this information is returned to the server and further employed in the routing functions described herein.

In operation, the system described herein provides for the routing of incoming telephone calls to a subscriber who may or may not currently have established an Internet connection over their line. A designated server is provided on the Internet in which the status of a subscriber may be updated with regards to whether or not a connection is currently established by the subscriber over the Internet. When an incoming call is received by the telephony network, an inquiry may be made of the server as to the status of the subscriber. If it is determined that the subscriber is not currently online, the telephone call may be further routed by the switching point to the subscriber's home. If it is determined that the subscriber is indeed online, the server may be informed that an incoming call has been received and the server may in turn then provide notification to the subscriber through a display graphic which may appear on the subscriber's PC display.

The display graphic is interactive in nature and a subscriber may make a selection as to how to route a particular call. Once this selection is made, the switching point is directed to carry out the instructions which may include routing the call to the subscriber once the Internet connection is terminated, routing an audio connection to the subscriber through a router connected to the Internet such that a conversation may be had employing IP telephony, or the call may be routed to a different location such as voicemail, a forwarding number, or a location in which the caller will hear an audio message.

Figure 4:
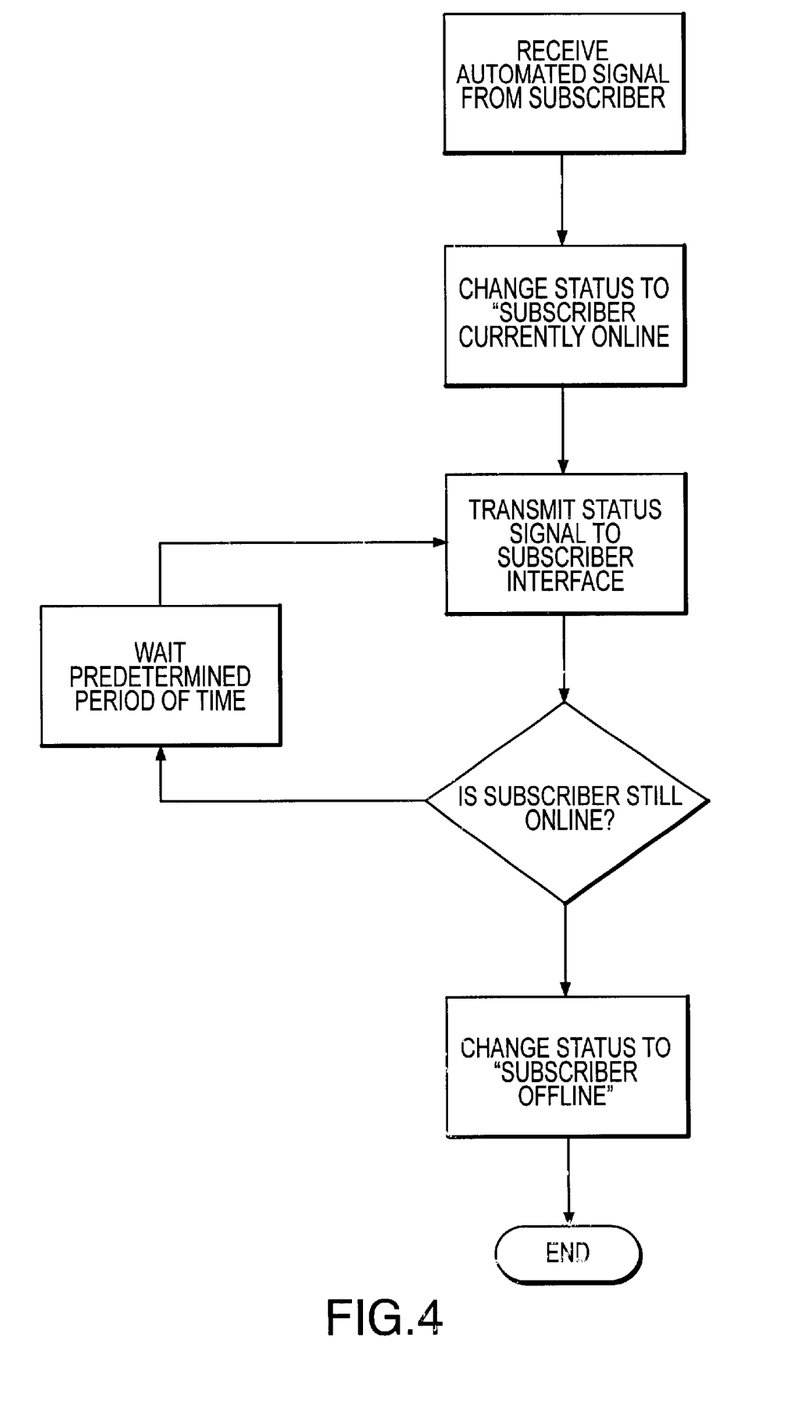
FIG. 4 discloses a flow chart which describes the operation of the status module in the communications server.

In order for the server to provide the call routing information disclosed above, the server first must have accurate information with regards to the current online status of the subscriber. Disclosed in FIG. 4 is a flow chart which describes the processes performed in order to update and otherwise change the status of the subscriber. Initially, when the subscriber establishes a connection with the Internet through the ISP, an automated function incorporated into the subscriber's login process establishes a connection with the communications server. Through this connection, the PC software provides an indication to the communications server that the subscriber is currently online. In response, the server changes the subscriber status. During the period that the subscriber is online, periodically the server will send queries to the subscriber's computer in order to determine whether the online status is still correct. As long as the server receives responses from the subscriber's computer, the status remains unchanged. Once the return signal is not received, the server changes the subscriber status to "subscriber offline".

When an incoming call is received at one of the SSPs, the destination information is extracted and the call is routed to the appropriate SSP for the subscriber. Once the call is received at the service control point for the subscriber, the SCP is notified that a caller is trying to establish a connection with this subscriber. The functions performed by the SCP in response to this notification is described in detail in FIGS. 5*a*–*c*.

Figure 5A:
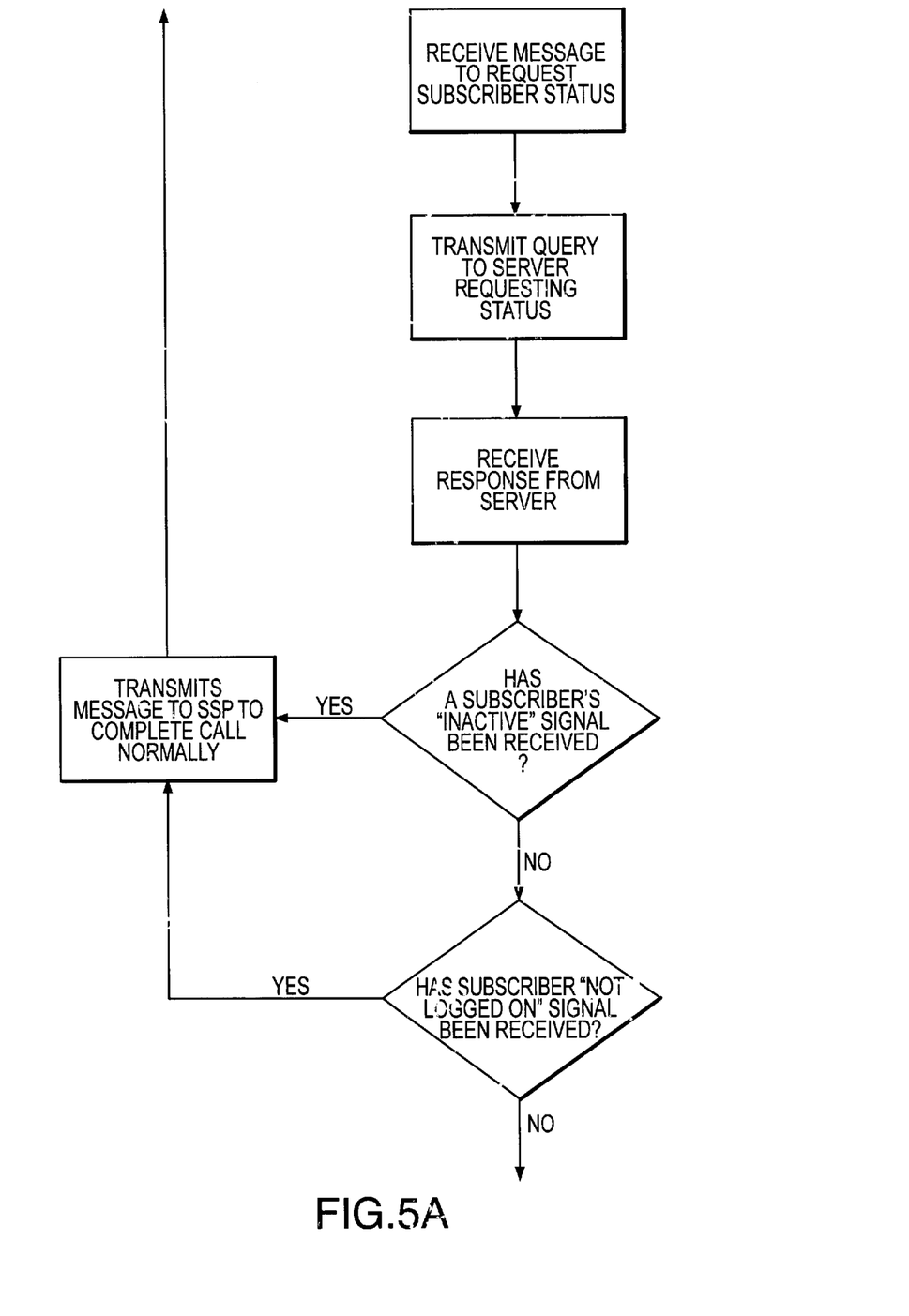
FIGS. 5a–c disclose a flow chart which describes the operations of the service control point (SCP) in the AIN.

Initially, when the incoming call request is received, the SCP transmits a query to the communications server over the Internet requesting a current online status for the subscriber. The first query made is with regards to whether the subscriber is an active user of the service. If the server indicates that the subscriber is not currently an active user of the service, the SCP directs the switching point to route the call to the subscriber's line in a normal manner. The normal manner may include routing the call directly to the subscriber's home line or directing the call to a voicemail or forwarded number or to a location where an audio message can be played. If a subscriber is "inactive" with regards to the services being provided, default routing may mean routing the call to the subscriber's number in a regular fashion.

Returning again to the flow chart of FIG. 5*a*, if it is determined that the subscriber has an active status, a determination is made as to whether the subscriber is currently logged onto the Internet. If the "subscriber is not logged-on" signal is received, the SCP directs the switching point to route the incoming call to the subscriber's line.

If the server returns a logged-in signal for the subscriber, the SCP then submits a name query to the LIDB in order to get caller identification information for the caller. Once this information is retrieved from the LIDB, it is then transmitted to the communications server over the Internet. The use of this information by the communications server in order to provide the subscriber an interactive display graphic is described in greater detail below.

Returning to FIG. 5*b*, while the SCP is waiting to receive instructions from the communications server with regards to the routing of the incoming call, the SCP directs the switching point to direct the incoming call to a designated AIN IP. Once the call is received, the AIN IP is directed by the SCP to play an audio message. This audio message may provide information to the caller with regards to the current status of the routing process, or it may play continuous ring of a telephone. The AIN IP will provide notification to the SCP when the playing of the audio message is complete. A decision is then made as to whether the routing information has been received from the communications server. If it has not, another decision is made with regards to whether the time-out period has expired. If the time-out period has not expired, the AIN IP is instructed to play the audio message again. Once the time-out period does expire and routing information has not been received from the communications server, the SCP will direct the SSP to route the call in a default manner such as to a voicemail or a forwarding number.

Figure 5B:
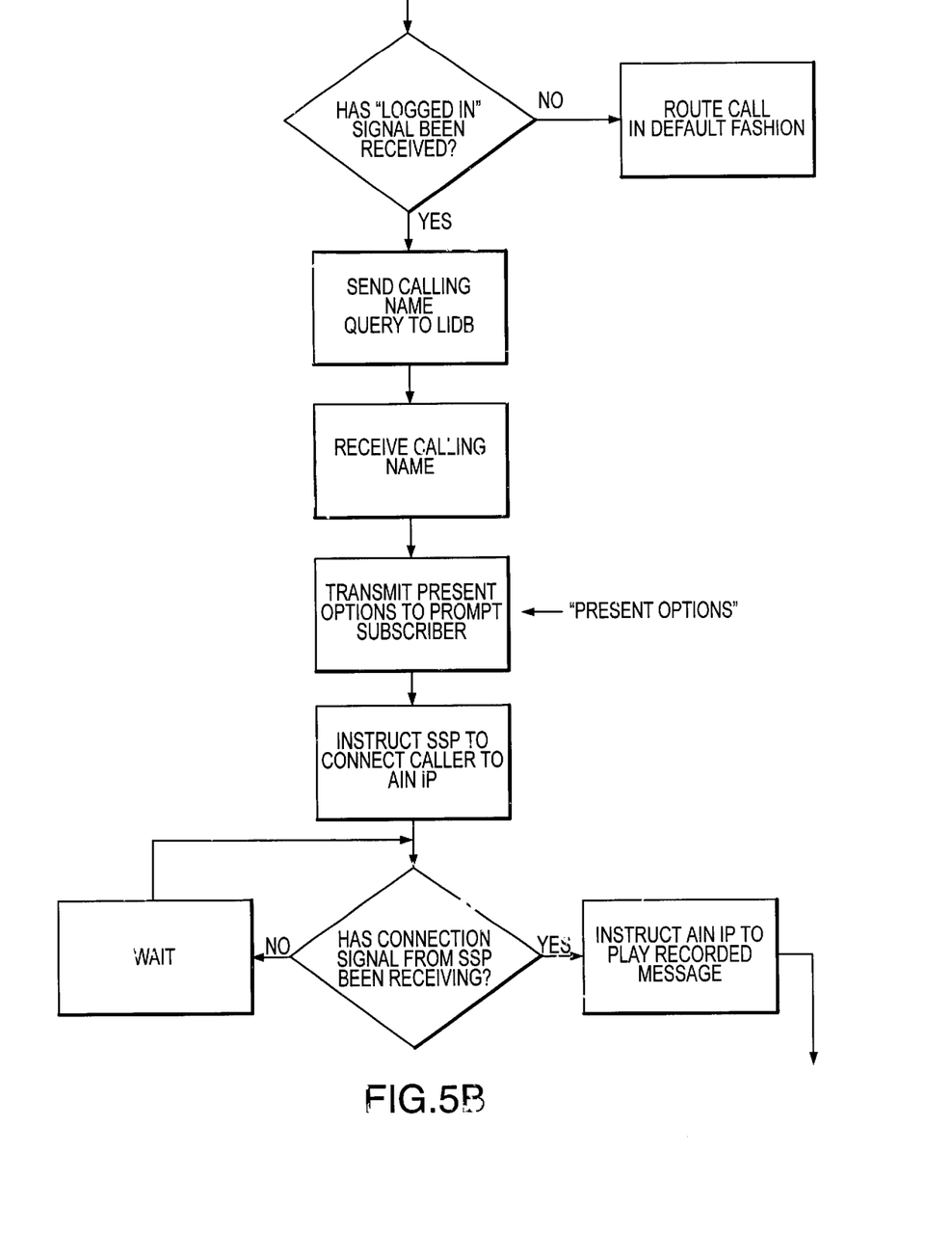

If, during the above-described period of time, routing information is received from the communications server, the SCP will direct the SSP accordingly. If the subscriber wishes to ignore the telephone call, the call may be routed to the same or another AIN IP where an audio message will be played informing the caller that the subscriber is currently online and is not taking telephone calls.

Figure 5C:
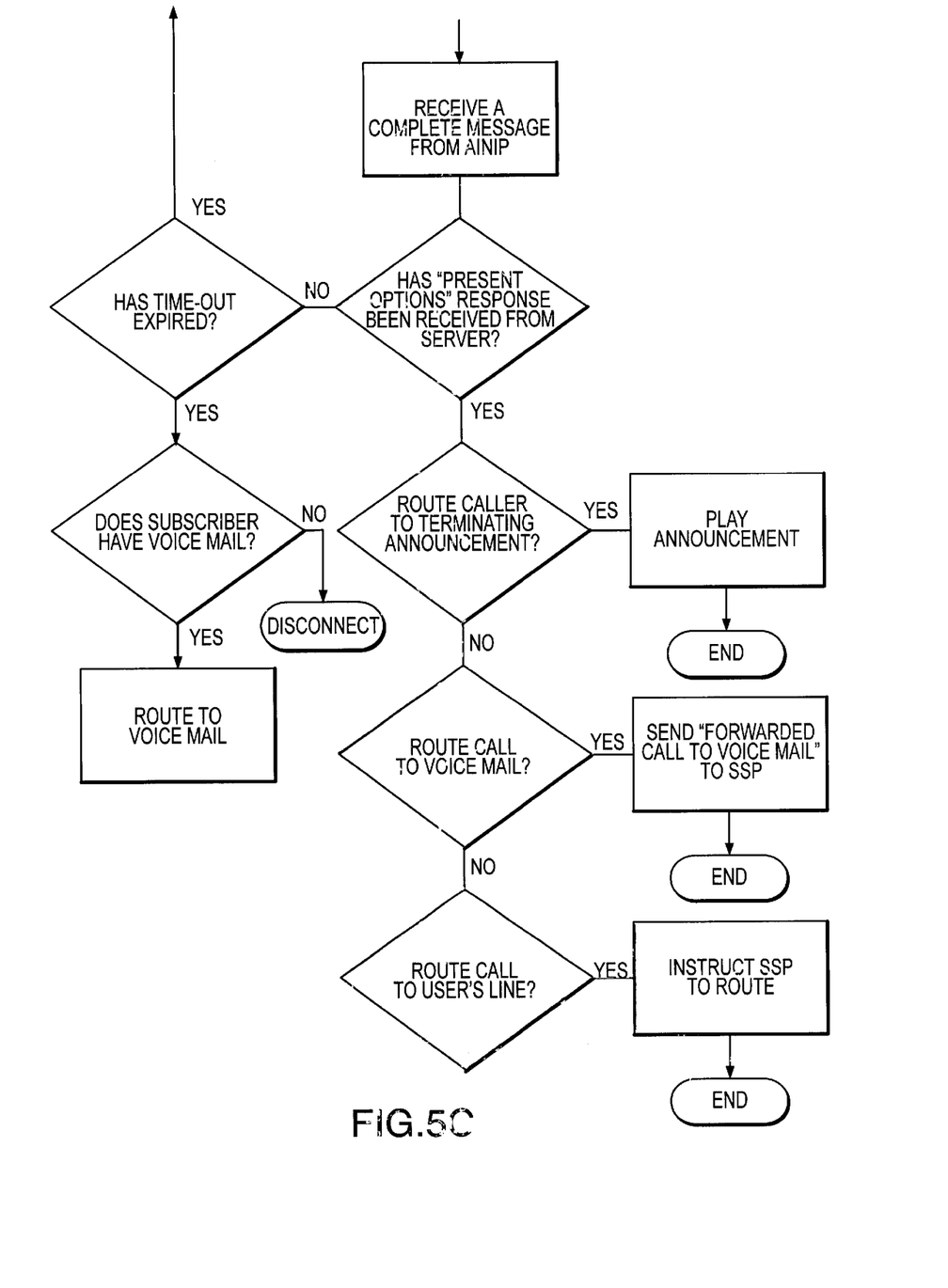

If the subscriber chooses to route the message to voicemail, the SCP directs the SSP to route the telephone call accordingly. At this point the caller may then leave a message for the subscriber. Another option provided to the subscriber is to forward the incoming call to a destination (a/k/a phone number). If the subscriber makes the selection to forward the call, the SCP will retrieve the forwarding number from the server's response and direct the SSP to route the call accordingly.

If the subscriber wishes to take the incoming call, at least two options are provided for directing the call. In the situation where the subscriber wishes to take the incoming call at a home telephone, the Internet connection is terminated, and the SSP routes the incoming call to the subscriber's home line.

Alternately, the subscriber may wish to receive incoming calls while maintaining the Internet connection. This may be done through commercially available IP telephony software, which may be installed on the subscriber's computer. If the subscriber chooses to receive the telephone call in this manner, the communications server will connect with the IP telephony gateway. The IP address for the subscriber currently logged on will be provided to the gateway. At this point the SSP directs the incoming call to the gateway, which in turn provides the conversion for the incoming telephone call to be transmitted over the Internet.

Figure 6A:
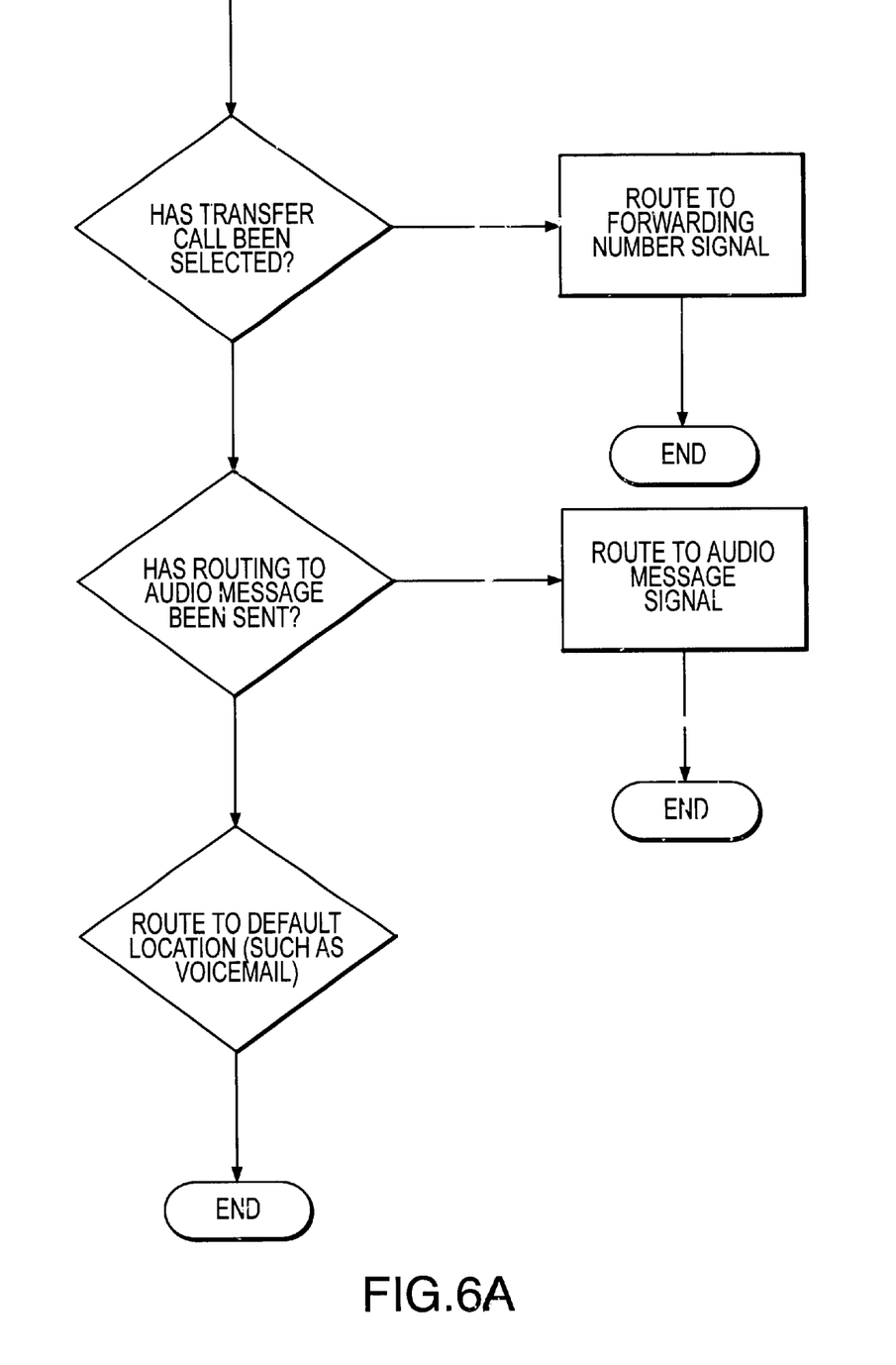
FIGS. 6a and b discloses a flow chart which describes the operations of the messaging module in the communications server.
Figure 6B:
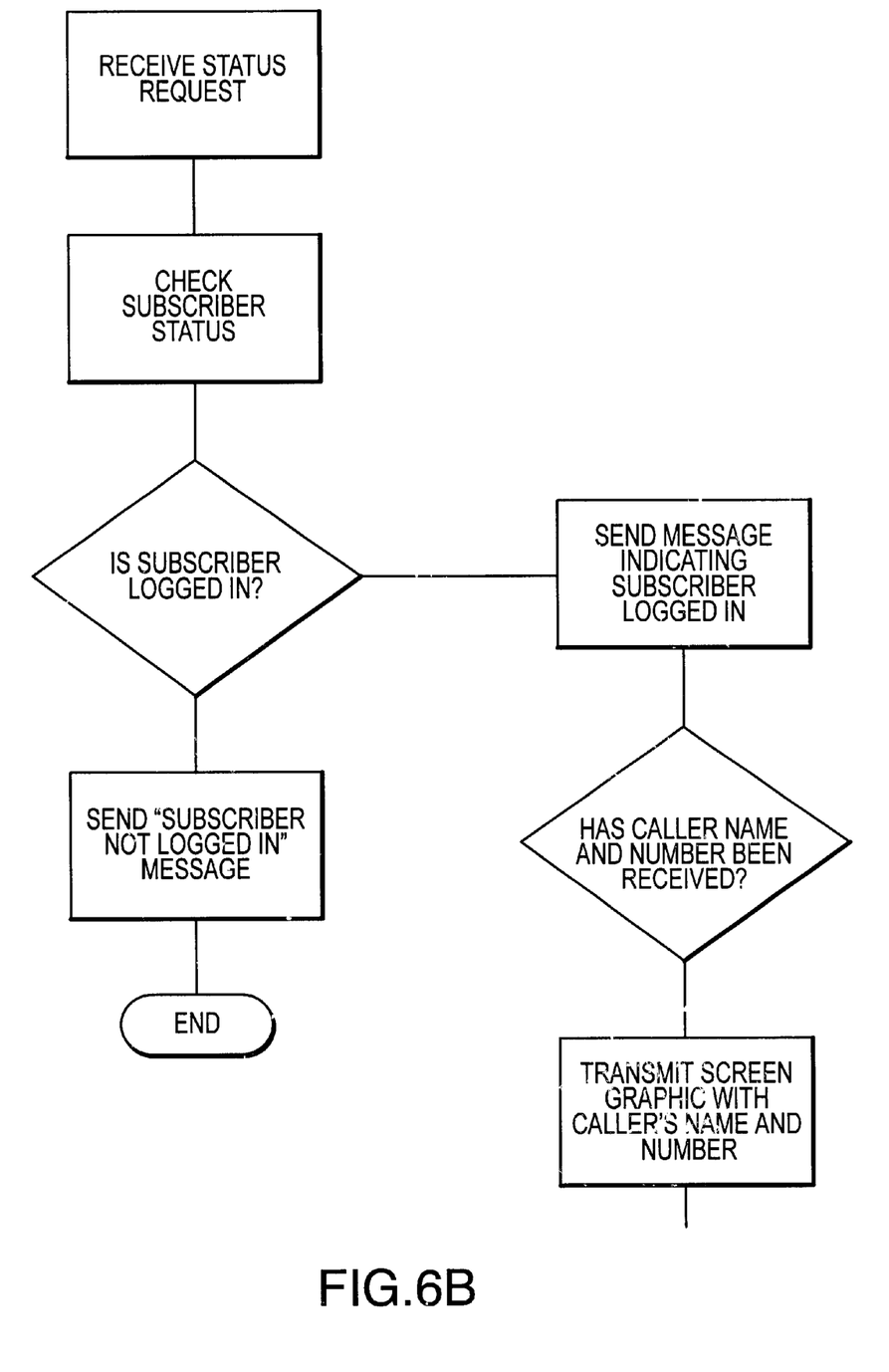

Disclosed in FIGS. 6a and b are a flow chart which describes in detail some of the operations performed by the communications server. As was described above, initially the communications server receives an automated login notification from the PC of the subscriber when a connection to the Internet is established. At this point, the communications server changes the status of the particular subscriber to "logged in". Once an incoming call is received by the telephony network, a request status message is received from the SCP. At this point, the server checks the database with the subscriber's status information and determines whether the particular subscriber for which the SCP is requesting information is active and is logged in. The results of this search are then transmitted to the SCP.

If the subscriber is currently logged in, the server transmits this status information to the SCP, and waits to receive identification information for the caller. Once this information is received, the server transmits a message to the subscriber's PC which results in the interactive graphic being displayed to the subscriber. The identification information for the caller is inserted in the display graphic. Through use of the PC software the subscriber is employing, the display graphic may be viewed and the subscriber may make a selection for routing the information. As described above, the display graphic may include choices such as ignoring the telephone call, taking the telephone call, or routing the telephone call to either a forwarding number or a voicemail account. Once the communications server receives a reply from the subscriber with routing information, this information is then transmitted over the Internet to the SCP.

Figure 7:
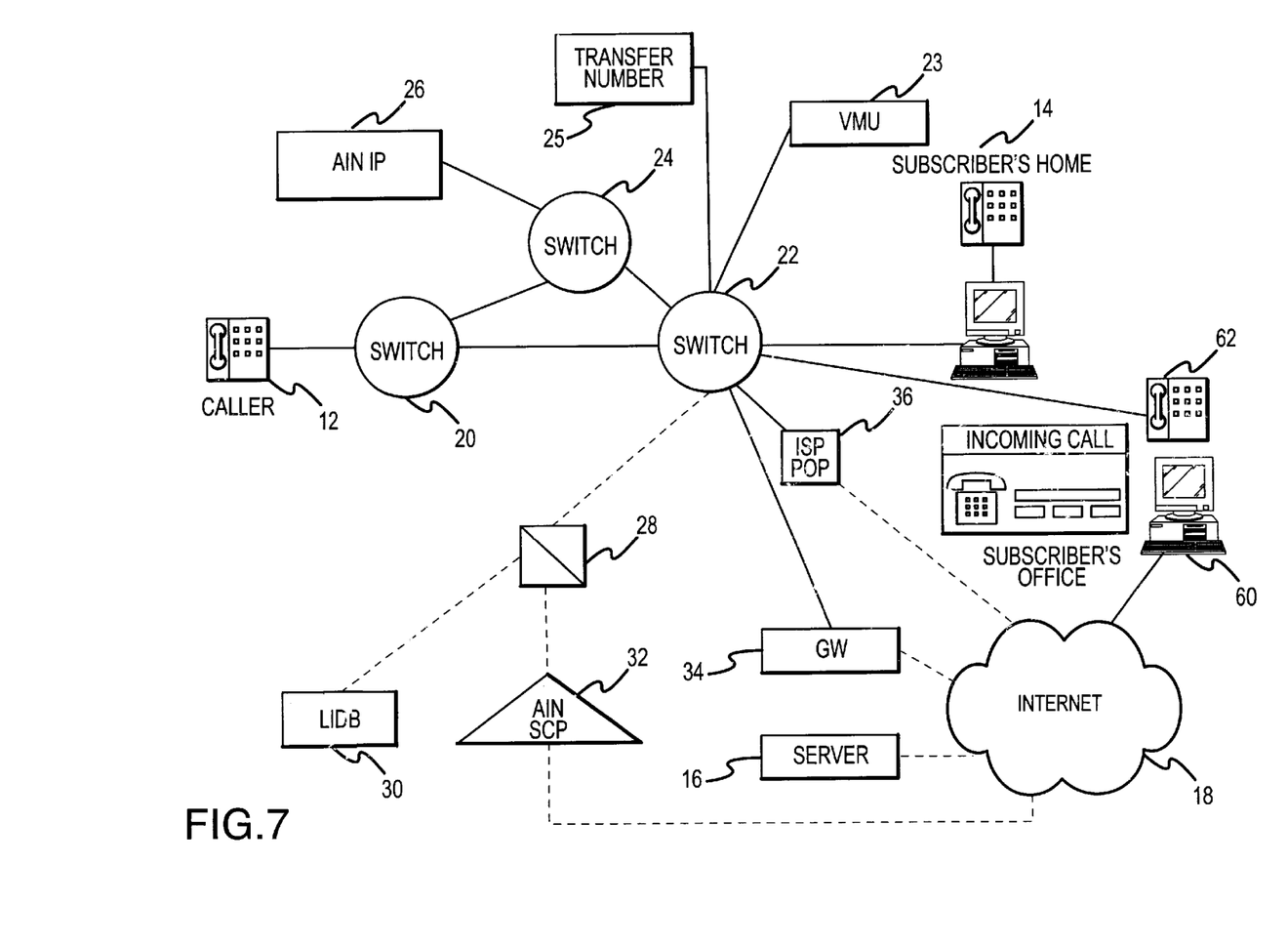
FIG. 7 discloses an embodiment of the system in which calls to designated phone line may be monitored from remote location.

An additional feature provided by the system described herein is the ability of a subscriber to monitor a particular line from a remote location. For example, the system provides the capability for a subscriber to monitor incoming calls to a subscriber's home from work wherein the subscriber has a computer with an Internet connection. Disclosed in FIG. 7 is a system diagram for the remote monitoring configuration of the call routing system described herein.

The two additional components now included in the system of FIG. 1 which includes, the subscriber's office computer 60 with a connection to the Internet, as well as the subscriber's office telephone 60 which is connected to the telephony network. In operation, when a subscriber logs onto the Internet at the office, either through an automated or manual function, the communications server is contacted and the subscriber's on-line status information is updated. In this situation, the status is still updated to "logged in". The IP address of the subscriber is noted.

When an incoming call for the subscriber's home is received, it is routed to the local switching point, which in turn informs the SCP of the call. At this point, the SCP establishes a connection with the communications server and requests on-line status information for the subscriber. The server informs the SCP that the subscriber is currently online the SCP then requests the identification information from the LIDB. Once the identification information is retrieved, it is included in an interactive graphical screen display, which is presented on the subscriber's PC. Through use of software incorporated into the work PC, the display graphic is presented to the subscriber who then may make a selection as to the routing of the incoming call.

In this configuration, all of the other routing options are included, with the exception of directing the telephone call to the home line. The option may also be provided to have the incoming call either forwarded to the subscriber's office telephone or to have the SCP direct the switch to route the incoming call to the subscriber's business IP address. In this situation, the subscriber has the necessary IP telephony software and/or hardware incorporated into the office computer. As with the connection established over the Internet from the subscriber's home, the communications server periodically queries the subscriber's office IP address to confirm that the subscriber is still online. If this connection is ever terminated, the communications server will detect this and automatically change the status of the subscriber.

The query function described above with regards to the subscriber's home computer as well as the office computer provides the advantage that the subscriber's on-line status is kept current, such that routing mistakes are not made. For example, in the situation where a computer error occurs and the subscriber is inadvertently knocked off line before it may change its status. In the situation where the subscriber's connection has been terminated, it would be unclear as to the ultimate disposition of such a call. However, where the communications server monitors this online connection, once the connection is terminated, the server notes this and may provide appropriate routing of the incoming telephone calls.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of routing telephone calls over an Advanced Intelligent Network (AIN) telephony network comprising the steps of:
   receiving an incoming call at a service control point (SCP) in a public switched telephone network for a subscriber;
   establishing a connection over a data network with a communications server specially configured to monitor whether the subscriber is employing an incoming telephone line associated with the SCP to establish a data connection with the data network;
   determining if the subscriber is employing the incoming telephone line with a data network connection;
   if the subscriber has a current data network connection, presenting an interactive screen display information the subscriber of the incoming telephone call; receiving from the subscriber instructions with regards to the routing of the incoming telephone call; and
   routing said incoming telephone call to a predetermined destination based on input received by the subscriber in response to presentation of the screen message.

2. The method of claim 1 wherein if the subscriber accepts the incoming call, routing the incoming call to at least one of: the subscriber's line when the Internet connection is terminated, to a data network gateway to establish an IP telephony connection with the subscriber.

3. The method of claim 1 wherein if the subscriber rejects the incoming call, routing the incoming call to a predetermined destination wherein the predetermined destination includes at least one of: voice mail, call forwarding, an audio message.

4. The method of claim 1 further comprising the step of playing an audio message to the caller while the notification message is presented to the subscriber.

5. The method of claim 1 wherein, upon initiation by the subscriber, the routing information is delivered to the subscriber over a connection other then the incoming telephone line.

6. The method of claim 1 further comprising the step of periodically querying the subscriber to determine if the subscriber has an active data network connection, and updating the online status accordingly.

7. The method of claim 1 further including the step of including caller identification in the interactive screen display.

8. A system for routing telephone calls in an advanced intelligent network (AIN) telephony network, comprising:
   a local switch in the telephone network associated with the subscriber which receives incoming calls for the subscriber, provides for routing connections from the subscriber to a designated destination;
   a service control point in connection with the local switch which provides a connection from the telephone network to a data network, wherein the queries received for the incoming telephone calls from the local switch may be transmitted to a designated location on the data network and responses may be received from the data network which includes routing instructions for the incoming call which may be provided to the switch for routing the incoming call to a selected destination; and
   a network server in communication with the service control point over the data network, wherein the network server is configured with: a status module which may be accessed by the SCP to retrieve updated information as to the subscriber's online status, a messaging module configured to transmit data signals to the subscriber wherein the data signals are employed to populate an interactive display graphics which are presentable to the subscriber and is further configured to receive the routing instruction entered through the interactive display which in turn are transmitted to said SCP.

9. The system of claim 8 further including a LIDB from which identification information may be accessed for the incoming call and included with the queries.

10. The system of claim 8 wherein in the interactive display graphic includes information with regards to receipt of the incoming call and at least one choice which a subscriber may choose for routing the incoming call.

11. The system of claim 8 wherein the telephony network includes at least one routing destination other than the incoming line for the incoming call.

12. The system of claim 11 wherein the routing destination comprises at least one of: voice mail, call forwarding, and audio message.

13. The system of claim 8 wherein the telephony network includes a gateway which through which the incoming call may be routed to establish an IP telephony connection with the subscriber.

14. The system of claim 8 wherein the data network is the Internet.

* * * * *

UNITED STATES PATENT AND TRADEMARK OFFICE
CERTIFICATE OF CORRECTION

PATENT NO.     : 6,366,661 B1
DATED          : April 2, 2002
INVENTOR(S)    : Devillier et al.

It is certified that error appears in the above-identified patent and that said Letters Patent is hereby corrected as shown below:

<u>Title page,</u>
Item [73], please delete the word "Quest" and insert therefor -- Qwest --.

Signed and Sealed this

Eleventh Day of June, 2002

Attest:

Attesting Officer

JAMES E. ROGAN
*Director of the United States Patent and Trademark Office*